(12) United States Patent
Cai et al.

(10) Patent No.: US 7,386,040 B1
(45) Date of Patent: *Jun. 10, 2008

(54) SYSTEM AND METHOD FOR OPTIMIZING DIGITAL SUBSCRIBER LINE PERFORMANCE BETWEEN TRANSCEIVERS FROM MULTIPLE MANUFACTURERS

(75) Inventors: Lujing Cai, Tinton Falls, NJ (US); Ehud Langberg, Wayside, NJ (US); Shareq Rahman, Avenel, NJ (US); William H. Scholtz, Middletown, NJ (US)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 474 days.

This patent is subject to a terminal disclaimer.

(21) Appl. No.: 11/117,252

(22) Filed: Apr. 28, 2005

Related U.S. Application Data

(63) Continuation of application No. 09/732,456, filed on Dec. 6, 2000, now Pat. No. 6,967,996.

(60) Provisional application No. 60/169,072, filed on Dec. 6, 1999.

(51) Int. Cl.
*H04L 5/16* (2006.01)

(52) U.S. Cl. ...................................... 375/222

(58) Field of Classification Search ................ 375/220, 375/222
See application file for complete search history.

(56) References Cited

U.S. PATENT DOCUMENTS

| | | | | |
|---|---|---|---|---|
| 5,311,578 | A * | 5/1994 | Bremer et al. | 379/93.32 |
| 6,047,025 | A | 4/2000 | Johnson et al. | 375/232 |
| 6,339,613 | B2 | 1/2002 | Terry | 375/227 |
| 6,535,550 | B1 | 3/2003 | Cole | 375/222 |
| 6,757,325 | B1 * | 6/2004 | Abdelilah et al. | 375/222 |

* cited by examiner

*Primary Examiner*—Kevin Kim
(74) *Attorney, Agent, or Firm*—Thomas, Kayden, Horstemeyer & Risley LLP

(57) ABSTRACT

An improved ADSL modem is presented. The ADSL modem in cooperation with a remote ADSL modem will exchange manufacturer identification information during initial DSL system training to establish a DSL communication link. The improved ADSL modem may comprise a memory device containing system parameters and operational algorithms previously determined to maximize DSL link performance between ADSL modems manufactured by different vendors. The improved ADSL modem is well suited for central office applications as it provides a solution for optimizing system performance that is transparent to remotely located ADSL modems. An ADSL modem in accordance with the present invention may comprise a digital signal processor and a memory device configured to store appropriate system parameters and operational algorithms that provide an optimized DSL communication link once applied during system initialization. The present invention also provides a method for optimizing DSL system performance. The method can be described by the following steps: supplying a default manufacturer identification for a remote modem at a master modem; applying appropriate system parameters and algorithms in response to the default manufacturer identification; initializing DSL system start-up training; receiving the actual manufacturer identification for the remote modem; determining if the current system parameters and algorithms are suitable for a DSL link with the actual manufacturer; adjusting training parameters and algorithms; restarting training when required; and establishing the DSL link.

19 Claims, 5 Drawing Sheets

SYSTEM AND METHOD FOR OPTIMIZING DIGITAL SUBSCRIBER LINE PERFORMANCE BETWEEN TRANSCEIVERS FROM MULTIPLE MANUFACTURERS

CROSS-REFERENCE TO RELATED APPLICATION

This is a continuation of U.S. application Ser. No. 09/732,456, filed on Dec. 6, 2000, now U.S. Pat. No. 6,967,996.

The present application claims the benefit of co-pending U.S. provisional patent application, issued Ser. No. 60/169,072 and filed Dec. 6, 1999, which is hereby incorporated by reference in its entirety.

FIELD OF THE INVENTION

The present invention generally relates to high-speed data communications. More specifically, the invention relates to a system and method for applying compatible operational algorithms within a Digital Subscriber Line (DSL) modem to maximize system performance when it is determined that a remote DSL modem is supplied by a different manufacturer than the local DSL equipment.

BACKGROUND OF THE INVENTION

In recent years, telephone communication systems have expanded from traditional Plain Old Telephone System (POTS) communications to include high-speed data communications as well. As is known, POTS communications include the transmission of voice information, Public Switched Telephone Network (PSTN) control signals, as well as, information from ancillary equipment in analog form (i.e., computer modems and facsimile machines) that is transmitted in the POTS bandwidth.

Prompted largely by the desire of large businesses to reliably transfer information over a broadband network, telecommunications service providers have employed Discrete Multi-Tone (DMT) systems to provide a plethora of interactive multi-media digital signals over the same existing POTS twisted-pair lines. The practice of installing Asymmetric Digital Subscriber Lines (ADSL) using DMT systems to communicate both voice and data signals to a customer premise from a central office has proliferated over recent years. Since ADSL signals are transmitted in a higher frequency band than that of the POTS frequency band, transmitting signals from both the POTS and ADSL frequency bands over the same twisted-pair telephone line (even at the same time), is possible. Specifically, the POTS frequency band is generally defined from 0 Hz to 4 kHz, while ADSL frequency band is defined by a lower cutoff frequency of approximately 25 kHz and an upper cutoff frequency of approximately 1 MHz.

The key to ADSL is that the upstream and downstream bandwidths are asymmetric, or uneven. In practice, the bandwidth from the provider to the user (i.e., the downstream channel) will be the higher speed path. This is due to the limitation of the telephone cabling system and the desire to accommodate the typical Internet and video on demand usage patterns. The majority of data being transferred in support of both Internet and video on demand services is being sent to the user (e.g., computer programs, graphics, sounds and video) with minimal upload capacity required (e.g., keystrokes and mouse clicks). Downstream speeds typically range from 1.5 Mbps to 9 Mbps. Upstream speeds typically range from 64 kbps to 1.5 Mbps.

Reference is made to FIG. 1, which illustrates the delivery of broadband communication services via a prior art ADSL communication system 1 over a twisted-pair telephone line. In this regard, a central office 10 is configured to provide broadband services which it assembles via central office ADSL modems 45 for transmission over a twisted-pair telephone line 48 to a customer premise 50, or in the alternative, another central office 10. Examples of such broadband services are depicted as video conferencing 15, Internet 20, telephone services 25, movies on demand 30, and broadcast media 35. The central office 10 may assemble signals from the aforementioned broadband services via a Digital Subscriber Line Access Multiplexer (DSLAM) 40 for appropriate transformation and transmission by a plurality of ADSL modems 45. Each of the ADSL modems 45 may be in communication via a dedicated twisted-pair telephone line 48 with a suitably configured ADSL modem 55 at a customer premise 50.

As illustrated in FIG. 1, the DSLAM 40 and each of a plurality of ADSL modems 45 may be assembled within an ADSL service rack 36 within the central office 10. For simplicity of illustration and explanation, the ADSL communication system 1 presented in FIG. 1 is shown with a single ADSL service rack 36 for communicating each of the broadband services to N ADSL modems 55. The ADSL service rack 36 may be configured to supply conditioned resources necessary to support the operation of the N ADSL modems 45. Those skilled in the art will appreciate the scalability of the ADSL communication system 1 generally presented in FIG. 1. For example, the central office 10 may be configured with a plurality of Transmission Control Protocol/Internet Protocol (TCP/IP) routers and Asynchronous Transfer Mode (ATM) switches (not shown) that may distribute one or more broadband service signals to a plurality of DSLAMs 40. In turn, the plurality of DSLAMs 40 may further distribute the broadband service signals to a plurality of remotely located ADSL modems 55.

At the opposite end of the twisted-pair telephone line 48, the customer premise 50 may be configured with a compatible ADSL modem 55, which may be configured to process and distribute the multiple broadband services to appropriate destination devices such as a computer, television, and a digital telephone as illustrated. It is significant to note that that the customer premise 50 may have POTS devices such as a facsimile machine and an analog (POTS) telephone integrated on the twisted-pair telephone line 48 along with the ADSL modem 55. It is also feasible that the customer premise 50 may be replaced in some applications by another central office 10 or an ADSL repeater, where the POTS service may not be available or needed.

In the United States, an ADSL standard for physical layer operation was first described in the American National Standards Institute (ANSI) T1.413-1995, the *Network and Customer Installation Interfaces—Asymmetric Digital Subscriber Line (ADSL) Metallic Interface* specification. This document describes how ADSL equipment is to communicate over a previously analog local subscriber loop of the PSTN. The document does not describe the entire ADSL network architecture and services, or the internal functioning of the ADSL access node. The T1.413-1995 standard specifies such fundamentals as line coding (how the bits are sent) and the frame structure (how the bits are organized) on the twisted-pair conductor comprising the local subscriber loop. The T1.413-1995 standard specifies that compliant ADSL transceivers must use discrete multi-tone (DMT)

coding with either frequency division multiplexing (FDM) or echo cancellation to achieve full-duplex operation.

DMT divides the entire bandwidth range on the formerly analog pass band of the local subscriber loop into a large number of equally spaced channels or bins. Technically, they are sub-carriers, but many call them sub-channels. The entire bandwidth of approximately 1.1 MHz is divided into 256 sub-channels, starting at 0 Hz. Each sub-channel occupies 4.3125 kHz. Some of the sub-channels are reserved for special signals, while others are not used at all. For example, channel #64 at 276 kHz is reserved for a pilot signal. The general concept behind DMT and its use with regard to ADSL communication systems is illustrated in FIGS. 2 through 4.

Looking at FIG. 2, the plot generally denoted by reference numeral 60 shows the number of encoded bits per channel per second that may be transferred (i.e., transmitted across) an ideal communication system. As illustrated in the plot 60 of FIG. 2, the number of bits transferred over time across each of the 256 sub-channels in an ideal (i.e., loss less) communication system would be constant and limited only by the transmit power capacity of the transmitter.

However, a number of environmental factors affect the maximum throughput of an ADSL communication system 1 (FIG. 1) as illustrated in FIG. 3. First, the signal gain (i.e., the reciprocal of attenuation or system signal loss) varies as a function of frequency. At higher frequencies, distance effects dominate; at lower frequencies, impulse noise and crosstalk effects dominate. This leaves the broad middle range from about 25 kHz to 1.1 MHz for signals, with the gain slowly dropping off with increasing frequency. Second, bridged taps may affect the frequency response of individual twisted-pair telephone transmission lines 48 (FIG. 1) as evidenced by the notch in the middle of the real loop gain plot 70 of FIG. 3. Last, the bandwidth from 25 kHz to 1.1 MHz is shared with radio frequency broadcast transmitters. Local broadcasts originating at one or more Amplitude Modulation (AM) radio stations may interfere with several DMT sub-channels rendering the ADSL signal to noise ratio too low for error free data transfers over the affected sub-channels.

As a result, most DMT systems use only 250 or less sub-channels for information transfers. The lower sub-channels, #1 through #6 in most cases, are reserved for the 0 Hz to 4 kHz pass band for analog voice. The signal loss at the upper channels, such as #250 and above, as illustrated by the actual loop gain plot 70 of FIG. 3 is usually so great that it is difficult to use them for information transfer across long subscriber loops at all.

A typical DMT sub-channel distribution is presented in FIG. 4. The exemplary bits per channel plot 80 shows that the lower frequency sub-channels may be reserved for analog voice or POTS communications. Next, there are 32 upstream channels, usually starting at channel #7. Last, the remaining sub-channels may be used for downstream data transmissions, which gives ADSL its characteristic asymmetric bandwidth. When echo cancellation is used, the upstream and downstream frequency ranges may overlap providing approximately 250 sub-channels for downstream data transfers. When FDM is used for echo control, as illustrated in the plot 80 of FIG. 4, usually only 218 downstream channels remain available for downstream data transfers as a number of the sub-channels are removed to form a guard band between the upstream and the downstream channels.

As further illustrated in FIG. 4, the upstream channels occupy the lower frequency channels whereas the downstream channels occupy the higher frequency channels. The upstream channels occupy the lower end of the spectrum for two reasons. First, the signal attenuation is less over that range of frequencies and customer transceivers are typically lower-powered than local exchange transceivers. Second, there is more noise at the local exchange transceivers (i.e., within the central office 10) and a higher probability of crosstalk, so it makes sense to use the lower frequencies for upstream signal transmissions.

When ADSL transceivers that employ DMT are activated, each of the sub-channels is tested by the transceivers. The testing procedure is a complex handshaking procedure whereby the transceivers determine an appropriate gain (the reciprocal of attenuation) and noise for each of the sub-channels. Usually, each of the numerous sub-channels available for data transfers employs a quadrature amplitude modulation (QAM) coding technique to send bits over the sub-channel. The total system throughput is the sum of all the QAM bits sent via the active sub-channels.

Moreover, all active sub-channels are constantly being monitored for performance and errors. The data transfer rate attributable to each individual sub-channel or group of sub-channels can actually vary, giving DMT a granularity of 32 kbps. In other words, a DMT device (i.e., an ADSL transceiver) may operate at 768 kbps or 736 kbps (i.e., 32 kbps less) or at other rates which are multiples of 32 kpbs, depending on operational and environmental conditions.

DMT systems, by nature of their distribution across multiple frequency bands, are capable of retuning devices to optimize data transfer rates for changing line conditions. DMT devices selectively transfer bits from the data stream in those discrete frequency bands that are uncorrupted from AM radio interference and unaffected by phone system bridge taps, thereby tuning, or maximizing performance under changing line conditions.

The ANSI T1.413-1995 standard for ADSL communication over a PSTN provided twisted-pair telephone line 48 (FIG. 1) permits a great deal of flexibility in implementation details. While the T1.413 standard provides for data connectivity between multiple equipment manufacturers, the standard does not assure optimum performance between modems supplied by different manufacturers. Each manufacturer, using the flexibility provided by the T1.413 standard, typically generates algorithms that take into account the advantages and limitations of their particular hardware design to maximize system performance when communicating with their own modems. Moreover, there are many portions of the T1.413 standard that are interpreted differently by the various manufacturers. For example, the capability of DMT based ADSL systems to adaptively adjust the data transfer rate is designed to achieve a data transfer rate that is within 32 kbps of the highest achievable data transfer rate given the length of a particular twisted-pair telephone line 48 (FIG. 1) and present environmental variables (e.g., the ambient temperature, humidity, the presence of one or more bridged taps, and RF interference affecting the line). However, the achieved data rate between a pair of DMT based modems originating from two different manufacturers is highly dependent on the type of filters used by each modem, how well the equalization algorithms used in one modem work with the other, and various other DSP related parameters. There can also be subtle incompatibilities in the rate negotiation portion of the training phase. For at least these reasons the actual data rate achieved between a pair of modems from different manufacturers can be well below the maximum possible rate for the given line conditions.

According to the T1.413-1995 standard, in order to establish a data connection between two ADSL compliant modems, the modems must perform a startup procedure or training phase. During the training phase, in addition to measuring actual twisted-pair telephone line 48 (FIG. 1) conditions, the modems exchange pre-assigned manufacturer identifications (IDs). Even though the modems exchange vendor or manufacturer IDs during the training process, the exchange occurs after the early phases of the startup training where equalizers and filters critical to data transfer performance are configured.

In light of the expected implementation and operational cost erosion for all data interface technologies, it is highly desirable to identify and implement communication links that exhibit increased performance with minimal added cost and complexity. With this goal in mind, there is a need for an improved system and method that can provide optimum performance between ADSL transceivers produced by different manufacturers, while minimizing installation and operational complexity, space requirements, and cost.

SUMMARY OF THE INVENTION

In light of the foregoing, the invention is a system and a method for determining the manufacturer of a remotely located modem paired on a digital subscriber line so that one of the paired DSL modems, typically the DSL modem located at a central office may apply manufacturer specific algorithms and an optimized set of system parameters when operating with identified remote DSL modems. An improved ADSL modem configured in accordance with the present invention may provide optimum data transfer performance with remote DSL modems supplied by multiple manufacturers. The improved ADSL modem optimizes system performance across multiple manufacturers using a procedure that complies with the ANSI T1.413 standard and that is transparent to the remote DSL modem. In a preferred embodiment, the improved ADSL modem achieves increased data transfer performance with a minimal hardware/firmware investment in the DSL modem equipment at a central office. An improved DSL modem in accordance with the present invention may comprise a digital signal processor (DSP) in communication with a memory device wherein the memory device is configured with at least one algorithm suited to maximize ADSL system performance along a DSL configured between the central office equipment manufacturer and the remote equipment manufacturer. In addition, the memory device may identify a set of operational parameters and algorithms selectively suited to maximize ADSL system performance for data communications between manufacturer identified ADSL modems.

The present invention can also be viewed as providing a method for optimizing DSL system performance between DSL modems supplied by different manufacturers. In its broadest terms, the method can be described by the following steps: supplying a default manufacturer identification to a master modem; applying appropriate system parameters and algorithms in response to the default manufacturer identification; initializing DSL system start-up training; receiving the actual manufacturer identification for the remote DSL modem; making a determination if the current system parameters and algorithms are compatible with the actual manufacturer; adjusting training parameters and algorithms when required in response to the actual manufacturer identification; re-initializing DSL system start-up training when necessary with the new manufacturer information; and corresponding algorithms and parameters; and establishing the DSL link.

Other features and advantages of the present invention will become apparent to one skilled in the art upon examination of the following drawings and detailed description. It is intended that all such additional features and advantages be included herein within the scope of the present invention, as defined by the claims.

BRIEF DESCRIPTION OF THE DRAWINGS

The present invention will be more fully understood from the detailed description given below and from the accompanying drawings of the preferred embodiment of the invention, which however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION OF THE PREFERRED EMBODIMENTS

It is significant to note that the system and method for optimizing DSL system performance between DSL modems supplied by different manufacturers are presented in association with a particular exemplary implementation using the central office located ADSL modem as a "master" when initializing a DSL communication link. Both the system and the method for optimizing DSL system performance between DSL modems supplied by different manufacturers in accordance with the present invention may be applied just as easily to a remotely located DSL device.

An improved ADSL modem in accordance with the present invention may be useful in implementing the "last mile" in a broadband service network. In other words, the capability to optimize the data transfer rate between ADSL modems supplied by different manufacturers may provide for a more efficient use of the network by permitting simultaneous distribution of multiple broadband services along with a voice (POTS) pass band over the twisted-pair telephone line currently supplied to most residences and small businesses by attaining the maximum data transfer rate that may be supported by a particular twisted-pair telephone line. In the specific example of a central office ADSL modem configured to record the manufacturer identification information upon the first ADSL link initialization, all subsequent start-ups of that same ADSL link may have the benefit of operating at an optimized data transfer rate. An improved ADSL modem in accordance with the present invention may be implemented with existing components and offers a transparent solution for the entire host of manufacturers that have supplied modems for remote location installation. Once the remote ADSL modem manufacturer has been identified the improved ADSL modem need only apply a set of pre-determined training parameters and algorithms suitable to maximize performance between ADSL modems supplied by the two manufacturers.

Figure 2:
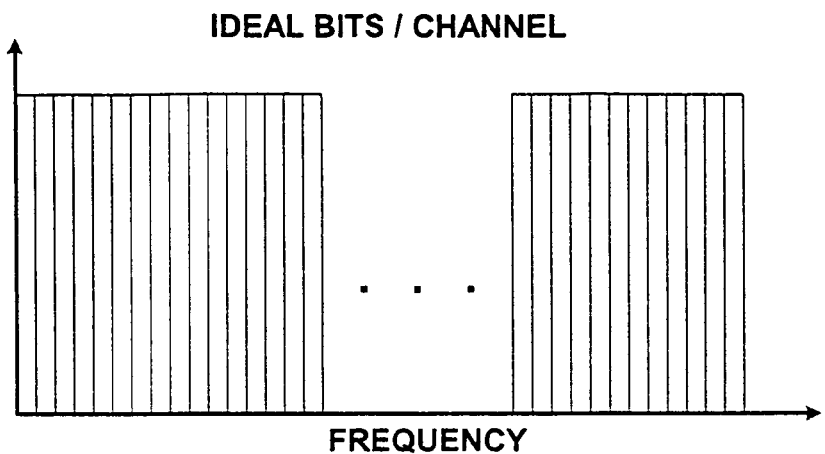
FIG. 2 is a plot illustrating the distribution of bits over frequency in an ideal environment using a DMT methodology for communicating between remote devices such as the ADSL modems of FIG. 1.
Figure 3:
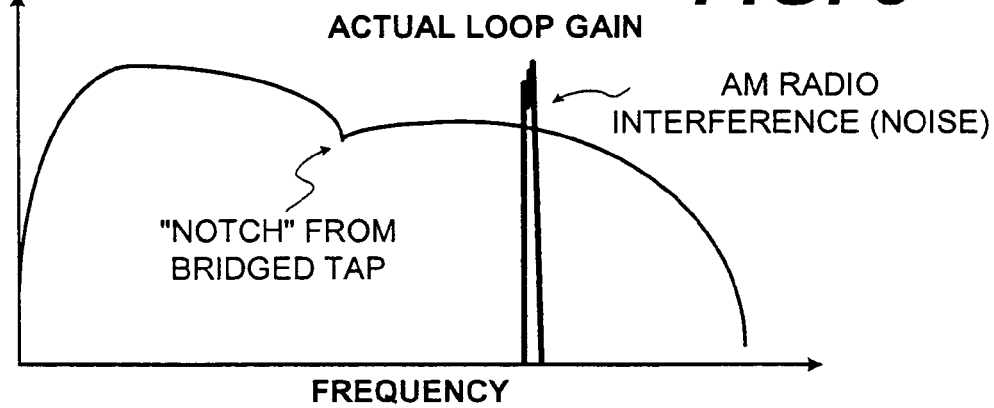
FIG. 3 is a plot illustrating the actual loop gain over frequency for an exemplary subscriber loop formed by a twisted-pair of copper conductors typically supplied between a central office and a remote location as may be encountered by the ADSL modems of FIG. 1.
Figure 4:
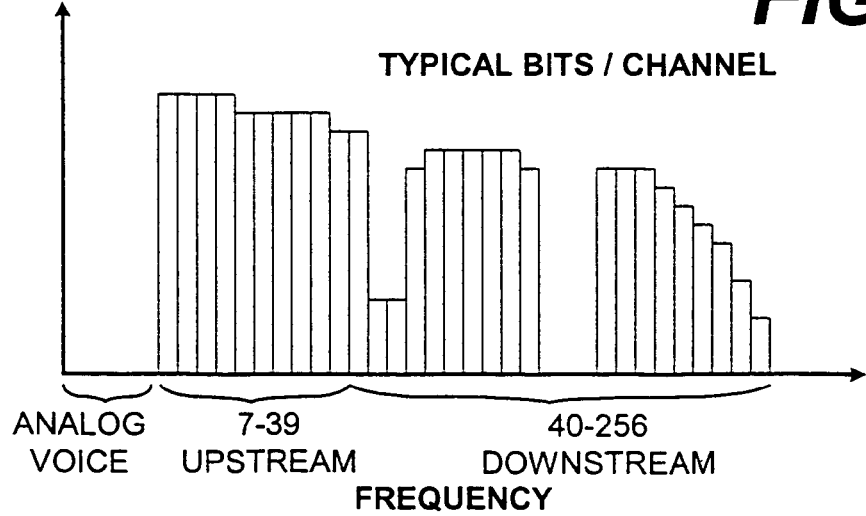
FIG. 4 is a plot illustrating an exemplary distribution of bits per sub-channel as may be applied by the ADSL modems of FIG. 1.
Figure 5:
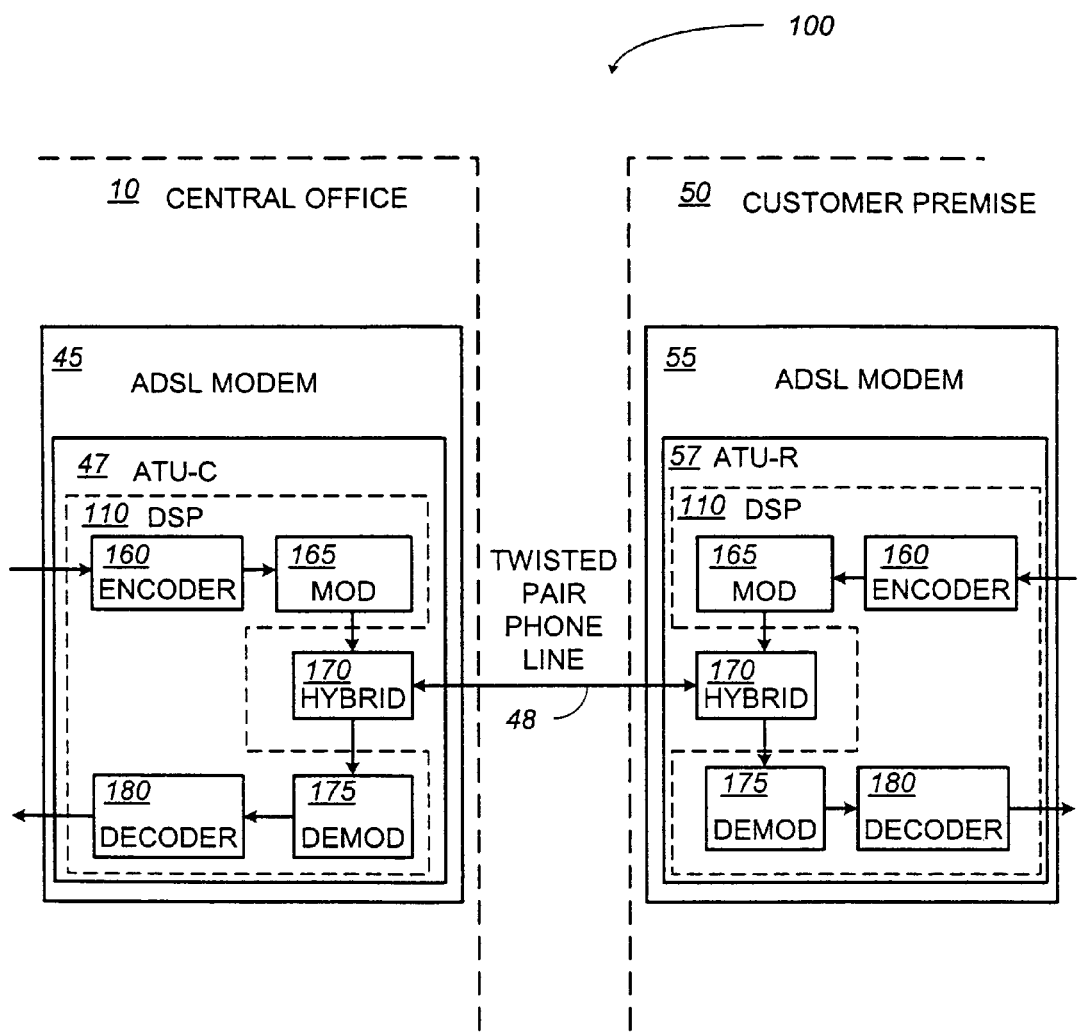
FIG. 5 is a functional block diagram further illustrating the operational of a DSL communication link between the ADSL modems used to support the ADSL communication system of FIG. 1

Having provided a brief description of a prior art ADSL communication system 1 configured to deliver a multitude of broadband services, and provided a brief discussion of the methodology surrounding the application of DMT with regard to FIGS. 2 through 4, reference is now made to FIG. 5, which illustrates a functional block diagram of an ADSL modem to ADSL modem communication link 100 featuring a central office ADSL modem 45 and a customer premise 50 located ADSL modem 55. As illustrated in FIG. 5, the ADSL modem to ADSL modem communication link 100 may communicatively integrate a central office 10 with a customer premise 50 via a twisted-pair telephone line 48. As further illustrated in FIG. 5, an ADSL modem 45 located within the central office 10 may comprise an ADSL Transmission Unit—Central office, hereinafter ATU-C 47. Similarly, an ADSL modem 55 located within the customer premise 50 may comprise an ADSL Transmission Unit—Remote, hereinafter ATU-R 57. Both the ATU-C 47 and the ATU-R 57 serve to enable two-way communications between ADSL modems 45 and 55 via the twisted-pair telephone line 48 of the PSTN.

As also illustrated in FIG. 5, the functional blocks forming the ATU-C 47 and the ATU-R 57 may be provided by a suitably configured Digital Signal Processor (DSP) 110. Since each of the ADSL modems 45 and 55 is similarly configured, the description herein will address the five common functional blocks only once.

Both the ATU-C 47 and the ATU-R 57 may receive digital data in encoder 160. Encoder 160 processes the digital data and forwards it to modulator 165, implemented with an inverse discrete Fourier transform (IDFT) in DMT, which adaptively applies the digital data across the ADSL frequencies. Modulator 165 then forwards a multitude of designated frequencies to hybrid 170 for data transmission along the phone line. In the manner described above, data is assembled, adaptively applied, and transmitted from one ADSL device to another across each of the separate phone lines as the physical characteristics of the environment surrounding each individual system allows.

In full-duplex ADSL transmission over a twisted-pair telephone line 48, a hybrid circuit 170 is needed to separate the upstream and downstream signals. The hybrid circuit 170 forwards the signal on the phone line to demodulator 175, implemented as a discrete Fourier transform (DFT). Frequently, signal conditioning and equalization are necessary before demodulation. Since these functional blocks are specific to each ADSL implementation, they are not discussed in detail here. Next, the demodulator 175 forwards the digital data to a decoder 180. The decoder 180 processes the digital data and distributes it to the appropriate application device, such as a computer, a television, or a digital phone as previously described with regard to the ADSL communication system 1 introduced in FIG. 1.

Figure 1:
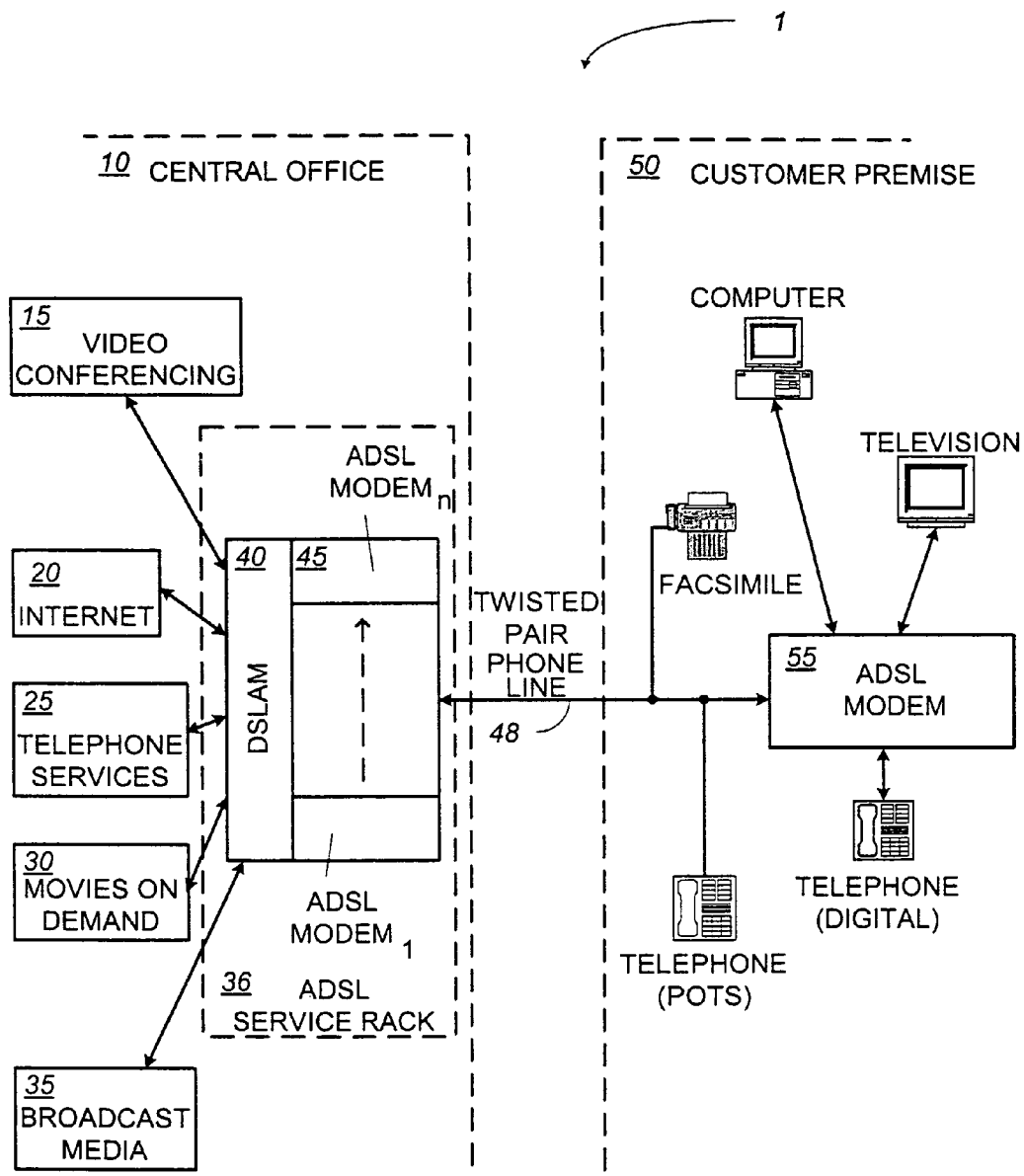
FIG. 1 is a schematic diagram illustrating a prior art ADSL communication system.
Figure 6:
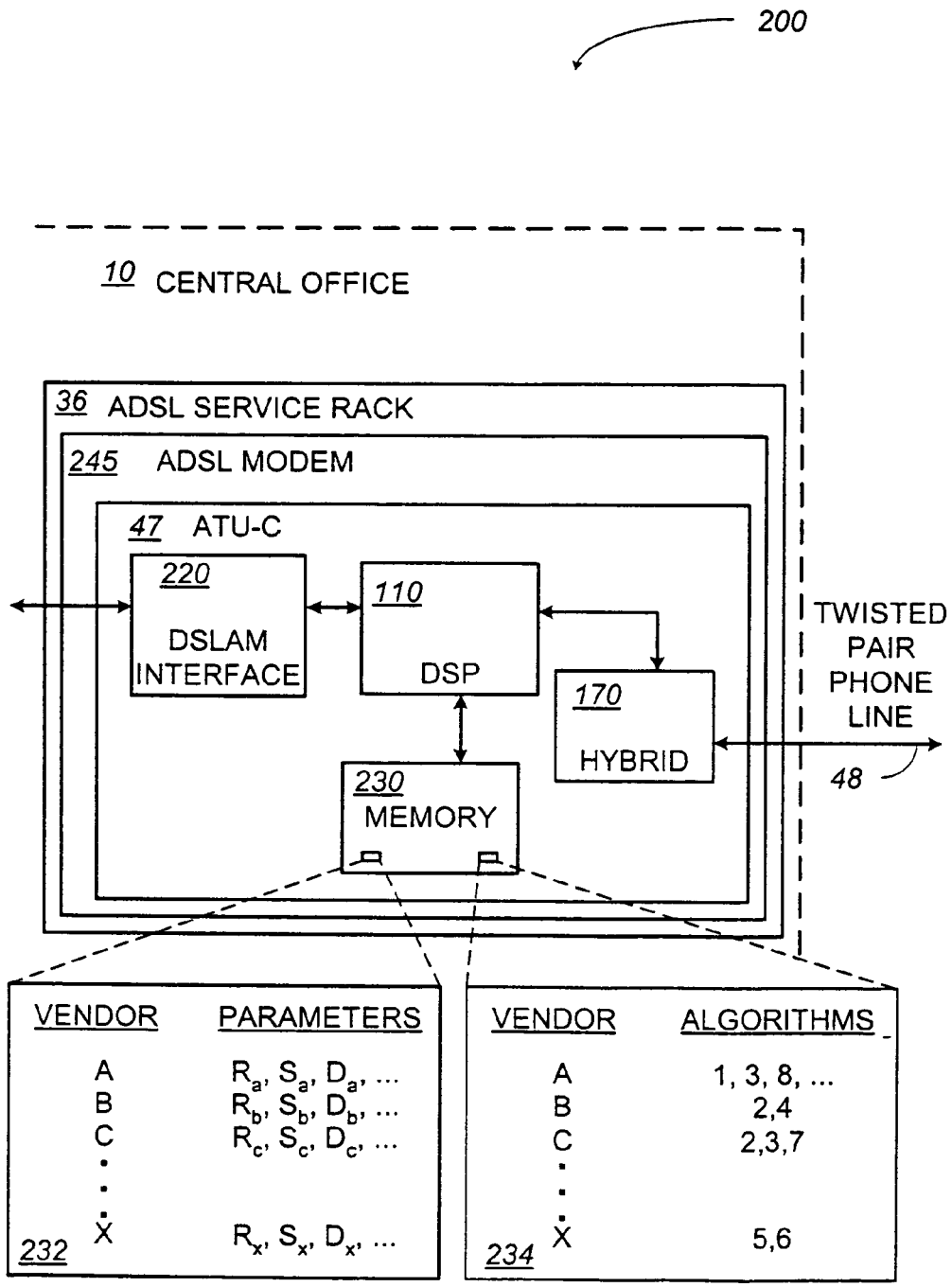
FIG. 6 is a functional block diagram illustrating an improved ADSL modem in accordance with the present invention.

As illustrated in FIG. 6, an improved central office ADSL system configuration 200 may comprise an improved ADSL modem 245 in accordance with the present invention located within an ADSL service rack 36 within a central office 10. As shown in FIG. 6, the improved ADSL modem 245 may comprise an ATU-C 47 with the ATU-C 47 further comprising a DSLAM interface 220, a DSP 110, a hybrid 170, and a memory device 230. As previously described with regard to the ADSL communication system 1 of FIG. 1, the DSLAM interface 220 may be configured to receive one or more broadband service signals from any of a number of devices. As illustrated in FIG. 6, the DSLAM interface 220 may be configured to communicate one or more broadband service signals to the DSP 110. In accordance with the ANSI T1.413 standard, the DSP 110 may be configured to act in concert with the hybrid 170 to apply a set of system parameters and algorithms in response to actual conditions on the twisted pair telephone line 48 to establish a working ADSL link with a suitably configured remote ADSL modem 55 (FIG. 1). For example, the system parameters may comprise B & G tables (containing bins or tones used and a corresponding power for each), forward error correction parameters R & S, an interleaver depth, D, and other distinctive parameters that may be configured in response to measured conditions on the twisted-pair telephone line 48. In addition, the DSP 110 may be configured to apply the aforementioned system parameters in one or more algorithms optimized for the particular hardware design selected by the ADSL modem's manufacturer.

As further illustrated in FIG. 6, the memory device 230 may comprise a first portion configured to store a vendor (i.e., a manufacturer) parameter list 232 and a second portion configured to store a vendor (i.e., a manufacturer) specific algorithm list 234. As indicated in the illustration of FIG. 6, the vendor parameter list may associate a plurality of system parameters with a plurality of remote DSL modem manufacturers, respectively. As further indicated in the illustration of FIG. 6, the vendor specific algorithm list 234 may associate one or more DSP 110 algorithms with each of a plurality of remote DSL modem manufacturers, respectively. It will be appreciated by those skilled in the art that an improved ADSL modem 245 in accordance with the present invention provides a mechanism whereby off-line analysis of ADSL communication links comprising a plurality of different ADSL modem manufacturers may be optimized by selectively applying system parameters and or a plurality of operational algorithms to identify optimal configuration solutions. It will be further appreciated that both a vendor specific parameter list and one or more vendor specific algorithms may be derived either by a trial and error process applying various ADSL modems 55 (FIG. 1) supplied by multiple manufacturers to an ADSL communication link 100 (FIG. 5) serviced by the improved ADSL modem 245 of FIG. 6 or during the modem development phase. In addition it will be appreciated that the improved ADSL modem 245 may provide a mechanism for optimizing an ADSL communication link 100 (FIG. 5) that is transparent to the ADSL modems 55 located within a customer premise 50.

Figure 7:
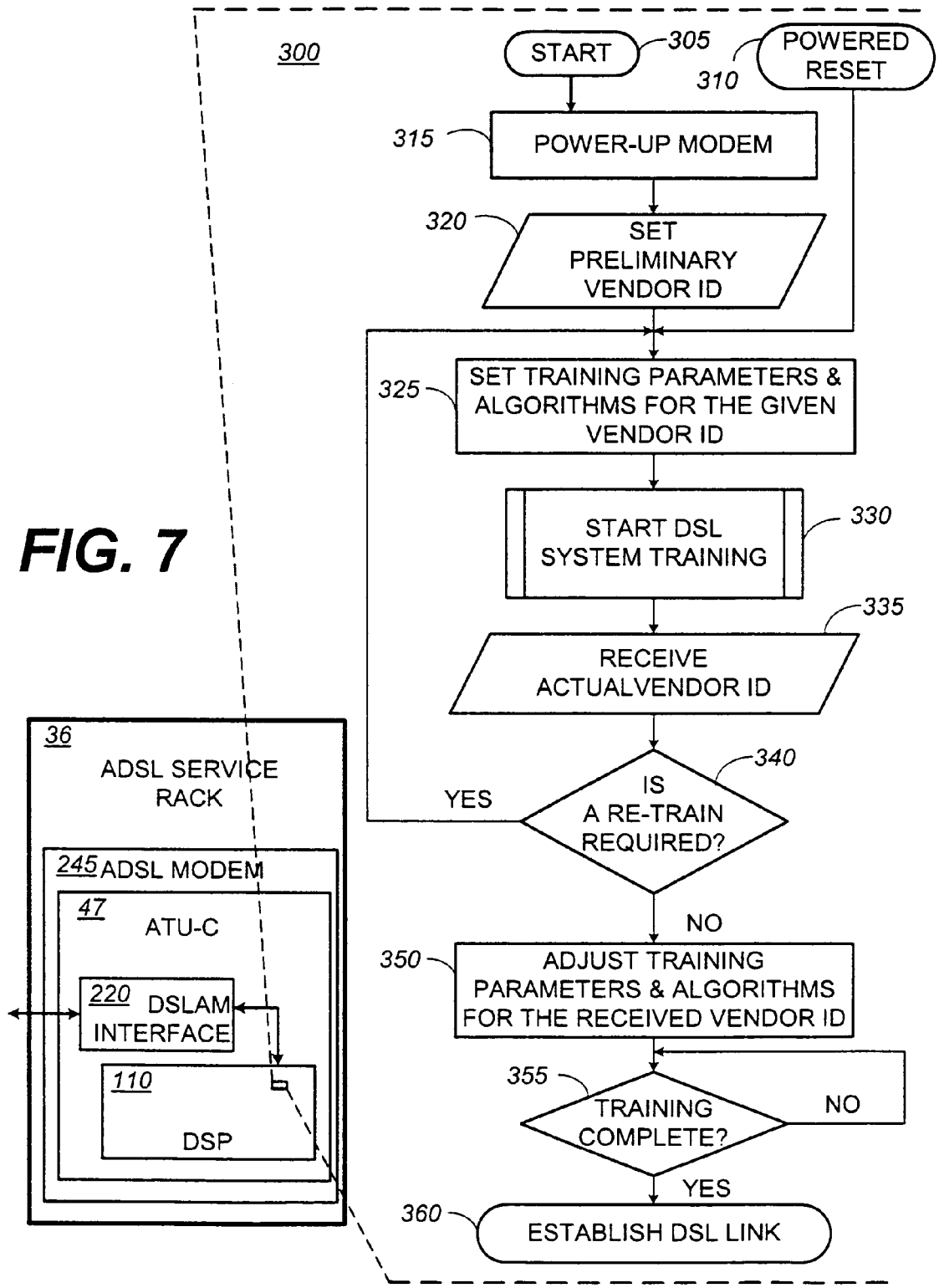
FIG. 7 is a flowchart illustrating a method for optimizing system performance between ADSL modems from different manufacturers that may be practiced by the improved ADSL modem of FIG. 6.

Having introduced and described an improved ADSL modem 245 in accordance with the present invention with regard to FIG. 6, reference is now directed to FIG. 7, which presents a flowchart illustrating a method for optimizing DSL system performance between DSL modems supplied by different manufacturers that may be performed by the improved ADSL modem 245 of FIG. 6. In this regard, a method for optimizing DSL system performance between DSL modems supplied by different manufacturers 300 may begin with step 305, herein designated as "Start." Next, in step 315, the method for optimizing DSL system performance between DSL modems supplied by different manufacturers 300 may apply power to the ADSL modem in response to an external input indicating that the ADSL modem should be configured to communicate with a remotely located ADSL modem 55 (FIG. 5). The method for optimizing DSL system performance between DSL modems supplied by different manufacturers 300 may proceed by applying a previously set default vendor identification as illustrated in step 320. It will be appreciated that the default vendor identification may be set in accordance with any of a number of criteria designed to result in a match between the default vendor identification and the actual manufacturer of the remotely located ADSL modem 55 (FIG. 5).

As indicated in step 325, the method for optimizing DSL system performance between DSL modems supplied by different manufacturers 300 may identify and apply a set of training or system parameters and operational algorithms in response to the default vendor identification. Next, in step 330, the method for optimizing DSL system performance between DSL modems supplied by different manufacturers 300 may start the DSL system training procedure. During the DSL system training procedure, the remote ADSL modem 55 (FIG. 5) will identify itself by communicating a vendor identification. As illustrated in FIG. 6, the method for optimizing DSL system performance between DSL modems supplied by different manufacturers 300 may perform a query in step 340 to determine if a re-train of the ADSL modems 245, 55 is in order based on the actual vendor identification received in step 335 or various performance measures using the current system parameters and operational algorithms used in the power-up training to this point. If the query in step 340 results in an affirmative response, that is a re-train is desirable, the method for optimizing ADSL system performance between ADSL modems supplied by different manufacturers 300 may return to step 325 where the actual received vendor identification information may be used to select another set of system parameters and operational algorithms suitable to optimize an ADSL communication link formed by the ADSL modems and the twisted-pair telephone line 48 (FIG. 5). Otherwise, if the query of step 340 results in a negative response, the method for optimizing DSL system performance between DSL modems supplied by different manufacturers 300 may be configured to perform step 350 where the training or system parameters and/or operational algorithms may be further adjusted to best accommodate communications with the identified remote ADSL modem. As also illustrated in step 350, the new vendor identification may be inserted into a memory device or buffer to replace the default vendor or manufacturer identification used in method step 320. Next, the method for optimizing DSL system performance between DSL modems supplied by different manufacturers 300 may check to determine if the system training is complete in step 355. If the response to the query of step 355 is affirmative, the method may be configured to establish ADSL communications as indicated in step 360. Otherwise, if the query performed in step 355 results in the determination that system training is still underway, the method may be configured to perform the query repeatedly after a suitable delay (not shown) before performing step 360.

Any process descriptions or blocks in the flow chart of FIG. 7 should be understood to represent modules, segments, or portions of code which include one or more executable instructions for implementing specific logical functions or steps in the process for optimizing the operation of an ADSL communication link comprising ADSL modems supplied by different manufacturers. Alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. For example, in an alternative embodiment, the query performed in step 340 may be omitted where it is determined that the training or system parameters and operational algorithms will be modified to match the actual received vendor or manufacturer identification information in all cases. In addition and as further illustrated in the flowchart of FIG. 7, a substantial portion of the method for optimizing DSL system performance between DSL modems supplied by different manufacturers 300 in accordance with the present invention may be triggered by an external request to perform a "powered" reset of the ADSL communication link as indicated in step 310 and the connecting flow arrow that enters the process between steps 320 and 325.

It will be appreciated that the method for optimizing DSL system performance between DSL modems supplied by different manufacturers 300 in accordance with the present invention may comprise an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Therefore, having thus described the invention, at least the following is claimed:

1. A method for establishing a digital subscriber line (DSL) link between first and second DSL modems comprising:
applying default system parameters for initial start-up training;
initiating DSL system start-up training;
receiving a manufacturer identification from the second DSL modem;
making a determination if the system parameters are suitable for DSL operation with the actual manufacturer of the second modem; and
adjusting system parameters when appropriate in response to the manufacturer identification.

2. A digital subscriber line (DSL) modem comprising:
a digital signal processor capable of being configured to selectively configure at least one system parameter in response to an identification of a manufacturer of the second DSL modem;
a memory device communicatively coupled to the digital signal processor and capable of being configured to store the at least one system parameter, wherein the system parameter is pre-configured with a default value which is used to establish data communications with a second DSL modem, wherein the memory device is configured to store at least one operational algorithm pre-configured to enhance data communications between the first and second DSL modems, and wherein the digital signal processor applies at least one operational algorithm after initial power-using the default value; and
logic configured to compare the default value with a manufacture-specific value of the at least one parameter, which manufacturer-specific value is received from the second DSL modem after initial power up.

3. The modem of claim 2, wherein the digital signal processor is capable of being configured to determine if expected system performance gains associated with retraining the DSL justify a retrain with system parameters previously identified as suitable for enhancing data communications between the first and second DSL modems.

4. The modem of claim 2, wherein the DSL modem is capable of being configured to replace the default value associated with the second DSL modem with a substitute value based on actual manufacturer identification information received during DSL initialization training.

5. A digital subscriber line (DSL) modem, comprising:
means for applying a default value of at least one system parameter during initial DSL system training with a remote modem;
means for determining a manufacturer-specific value for the at least one system parameter, based on an identified manufacturer of the remote modem; and
means for determining if the manufacturer-specific value would result in a measurable difference in DSL data transfer characteristics when compared to current DSL data transfer characteristics using the default value.

6. A digital subscriber line (DSL) modem, comprising:
means for applying a default value to at least one system parameter during initial DSL system training with a remote modem;
means for applying at least one operational algorithm, which utilizes the default value, during initial DSL system training with the remote modem;
means for determining a manufacturer-specific value for the at least one system parameter; and
means for determining if the at least one operational algorithm computed using the manufacturer-specific value for the at least one system parameter would result in a measurable difference in DSL data transfer characteristics when compared to current DSL data transfer characteristics using the default variable identified at least one operational algorithm.

7. The modem of claim 6, wherein the means for determining if at least one system parameter responsive to the actual manufacturer of the remote modem would result in a measurable difference in DSL data transfer characteristics comprises a digital signal processor in communication with a memory device.

8. The modem of claim 6, wherein the means for determining if at least one operational algorithm would result in a measurable difference in DSL data transfer characteristics comprises a digital signal processor in communication with a memory device.

9. A method for enhancing digital subscriber line (DSL) system performance between first and second DSL modems, comprising:
supplying a default value to a first modem;
applying appropriate system parameters in response to the default value;
initiating DSL system start-up training;
receiving an identification of a manufacturer of the second DSL modem;
determining a manufacturer-specific value; and
adjusting system parameters based using the manufacturer-specific value in place of the default value.

10. The method of claim 1, wherein applying default system parameters includes applying a set of operational algorithms.

11. The method of claim 1, further comprising establishing a DSL connection.

12. The modem of claim 2, wherein configuring at least one system parameter includes applying a set of operational algorithms.

13. The modem of claim 2, further comprising logic configured to establish a DSL connection.

14. The modem of claim 5, wherein applying a default value includes applying a set of operational algorithms.

15. The modem of claim 5, further comprising means for establishing a DSL connection.

16. The modem of modem 6, wherein applying a default value includes applying a set of operational algorithms.

17. The modem of claim 6, further comprising means for establishing a DSL connection.

18. The method of claim 9, wherein applying appropriate system parameters includes applying a set of operational algorithms.

19. The method of claim 9, further comprising establishing a DSL connection.

* * * * *